(12) United States Patent
Gluzberg et al.

(10) Patent No.: US 6,999,934 B2
(45) Date of Patent: Feb. 14, 2006

(54) METHOD AND SYSTEM FOR PROCESSING, STORING, RETRIEVING AND PRESENTING INFORMATION WITH AN EXTENDABLE INTERFACE FOR NATURAL AND ARTIFICIAL LANGUAGES

(75) Inventors: Victor Gluzberg, Haifa (IL); Alexander Brenner, Haifa (IL)

(73) Assignee: Holtran Technology Ltd., Haifa (IL)

( * ) Notice: Subject to any disclaimer, the term of this patent is extended or adjusted under 35 U.S.C. 154(b) by 0 days.

(21) Appl. No.: 10/851,117

(22) Filed: May 24, 2004

(65) Prior Publication Data

US 2004/0243395 A1   Dec. 2, 2004

Related U.S. Application Data

(60) Provisional application No. 60/472,428, filed on May 22, 2003.

(51) Int. Cl.
*G10L 19/00*   (2006.01)

(52) U.S. Cl. .............................. 704/500; 704/7; 704/9; 707/3

(58) Field of Classification Search .................... 707/3; 704/7, 9

See application file for complete search history.

(56) References Cited

U.S. PATENT DOCUMENTS

| | | | | |
|---|---|---|---|---|
| 5,806,060 A | * | 9/1998 | Borgida et al. | ................ 707/3 |
| 6,182,062 B1 | * | 1/2001 | Fujisawa et al. | ............... 707/3 |

* cited by examiner

*Primary Examiner*—W. R. Young
*Assistant Examiner*—Huyen X. Vo
(74) *Attorney, Agent, or Firm*—Mark M. Friedman (57) ABSTRACT

A method and system for processing, storing, retrieving and presenting information with an extendable interface for natural and artificial languages. The system includes an interpreter, a knowledge base, and an input/output module. Making use of an internal representation based on sorted-type theory, the system stores information in the knowledge base, answers queries from clients, and processes erroneous or contradictory information according to a dynamically adjustable set of rules. The system also stores language definitions in the knowledge base, enabling the system to communicate with clients in a variety of natural and artificial languages. New languages may be added to the system by presenting definitions expressed in a language already incorporated within the system.

21 Claims, 2 Drawing Sheets

Legend:

◆·····▶  information in external representation (built-in or derived languages)

◆────▶  information in internal representation (terms of sorted type theory)

⊏⋯⋯⋗  definitions of derived languages (in internal representation)

⇨  control

Legend:

◆····▶ information in external representation (built-in or derived languages)

◆——▶ information in internal representation (terms of sorted type theory)

┌╌╌╌▷ definitions of derived languages (in internal representation)

⇨ control

METHOD AND SYSTEM FOR PROCESSING, STORING, RETRIEVING AND PRESENTING INFORMATION WITH AN EXTENDABLE INTERFACE FOR NATURAL AND ARTIFICIAL LANGUAGES

This is a continuation-in-part of U.S. Provisional Patent Application No. 60/472,428, filed May 22, 2003.

FIELD AND BACKGROUND OF THE INVENTION

The present invention relates to a method and system for processing information, and, more particularly, to a method and system for processing information providing the following distinctive features:

the system is able to interact, via appropriate interface devices, with a wide variety of clients, including humans, computers, computer networks, and systems like itself;

the system is capable of adopting an unlimited set of languages, both natural and artificial, to be used in communicating with the external world;

all kinds of system input information, including definitions of new languages, can be presented in any currently adopted language having the capability of expressing that information (the system is capable of adopting a wide variety of languages, including languages of limited expressive capability, which may serve specialized purposes, and thus may not be suitable for the purpose of language definition);

the system is able to find, from previously processed and stored information, full, precise and specific answers to relevant questions;

a system response can be presented in any of the currently adopted languages according to the desire of the client, provided, as discussed above, that that particular language is capable of expressing that response (responses that cannot be expressed in the desired language are handled according to error-handling rules that may be dynamically modified to suit the needs of the client);

the system is able to automatically extend the lexicon of an adopted language when encountering new terms in a known context;

the system is able to fully store input information even in cases where that information includes currently incomprehensible fragments, those fragments being made comprehensible later by the system acquiring further knowledge.

These features are useful in applications in various industrial, commercial, social, scientific and educational domains, especially those characterized by:

availability of massive non-structured (textual) sources of information (such as catalogs, manuals, encyclopedias and codes of rules) and a necessity to provide effective extraction of precise and specific answers to particular questions;

necessity to provide easy and shared access to informational resources by wide communities of clients having no specialized knowledge of database systems, without preliminary training, and possibly speaking different languages;

necessity to merge and share knowledge and information stored in multiple informational systems created separately and specialized in different areas, for example, Product Design Management (PDM) and Enterprise Resource Planning (ERP) systems of large corporations, or information systems of separate government services;

necessity for automatic analysis, classification, referencing and translation of textual information (as in editorial and publishing houses).

The present invention makes use of Sorted-Type Theory. See for example, Daniel Gallin, *Intensional and Higher-Order Modal Logic*, North Holland Publishing Company (an imprint of American Elsevier Publishing Company), Amsterdam, 1975, ASIN: 044411002X, which is incorporated by reference for all purposes as if fully set forth herein. See also, for example, B. Carpenter, *Type-logical Semantics*, MIT Press, Cambridge, Mass., 1997, ISBN: 0262531496, which is incorporated by reference for all purposes as if fully set forth herein. A brief introduction to sorted-type theory follows:

A.1) $Ty_n$ language:

Basic concepts of any type theory are types and terms. In the n-sorted-type theory there are n+1 primitive types:

t—truth type $e_1, e_2, \ldots e_n$—types of entities (or individuals) of n different sorts and an infinite set of derived (functional) types which are built as ordered pairs of types, that is, if a and b are types, then (ab) is also a type.

For example, using the synonyms e,f, and g for $e_1, e_2$, and $e_3$, respectively, (et), t(ef), ((et)g) and (((et))(tg)) are all derived types of $Ty_3$. For the sake of brevity, we will omit below parentheses in functional types unless they are required to express pairing in an order other than from right to left, i.e., the types of this example would be written as: et, tef, (et)g, and ((et)f)tg.

Terms of $Ty_n$ are characterized recursively:

primitive terms of type a are variables $x_a^0, x_a^1, x_a^2, \ldots$ and constants $C_a^0, C_a^1, C_a^2 \ldots$ (the first three variables of type a will be also denoted by synonymous symbols $x_a, y_a, z_a$);

derived terms are built by means of the three fundamental operations of $Ty_n$:

if Y is a term of type ab and X is a term of type a, then application Y X is a term of type b;

if Y is a term of type b, then lambda abstraction $\lambda x_a^k Y$ is a term of type ab;

if X and Y are terms of type a, then equality X=Y is a term of type t.

Examples of $Ty_3$ terms include: $x_e^1, C_{(et)f}^{12}, C_{(et)f}^{12} x_{et}^4, \lambda x_{et}^4 c_f^6, x_{ef}^2 = C_{ef}^0$, and $C_{te}^5 (C_{gf}^1 = \lambda x_g C_f^9)$.

Below, important notions of free and bound occurrence of a variable in a term are used: an occurrence of a variable $x_b$ in a term $A_a$ is bound if it occurs only within a part like $\lambda x_b B_c$, otherwise it is said to be free.

All simpler terms incoming as constituents into a derived term (except bound variables) are said to be its sub-terms. For example, sub-terms of an application YX or an equality X=Y are X, Y and all sub-terms of X and Y (recursively); sub-terms of $\lambda x_a^k Y$ are Y and all its sub-terms. We will denote the fact that a term B is a sub-term of A with the notation A(B).

Given a term $A(x_a)$ and a term B, we say that B is free for $x_a$ in $A(x_a)$ if no free occurrence of $x_a$ in $A(x_a)$ lies within a part $\lambda y_b C$, where $y_b$ occurs free in B. In other words, B is free for $x_a$ in $A(x_a)$ if and only if no one of free variables of B proves to be bound when B replaces all free occurrences of $x_a$ in A.

A.2) $Ty_n$ Semantics:

Exploring now the meaning of $Ty_n$ terms, consider n arbitrary (but non-empty) sets $M_1, M_2, \ldots M_n$ and also a special set $\underline{2}=\{0, 1\}$ (note the underlining which serves to distinguish this notation from the numeral 2). Let us associate with any type a some set $M_a$ defined recursively as follows:

$M_t = \underline{2}$, $M_e = M_1$, $M_f = M_2$, and so on, $M_{ab} = M_b{}^{M_a}$ that denotes a set of functions from $M_a$ to $M_b$.

Let any constant of type a represent a certain element of $M_a$, and any variable of type a represent an arbitrary ("unknown") element of $M_a$. Then we can (again recursively) specify what is represented by any term:

Y X represents the result of the application of function [Y] to argument [X], where [$A_a$] denotes an element of $M_a$ represented by a term;

$\lambda x_a{}^k Y$ represents the function from $M_{ab}$ whose value for any X from $M_a$ is equal to $[Y](x_a{}^k/X)$, where $[Y](x_a{}^k/X)$, denotes that element of $M_b$ which is represented by Y, subject to the condition that $[x_a{}^k]=X$;

X=Y represents 1 if [X]=[Y] and 0 otherwise.

Thus, having assigned each $Ty_n$ constant $C_a{}^k$ an element $[C_a{}^k]$ of a corresponding set $M_a$, we can find an element [A] of a corresponding set for any given term A and for any given assignment to the $Ty_n$ variables. A mapping $M: C_a{}^k \rightarrow [C_a{}^k]$ (for given sets $M_1, M_2, \ldots M_n$) is said to be a model of $Ty_n$ based on $M_1, M_2, \ldots M_n$.

Now, a few new, simple but important definitions:

a formula of $Ty_n$ is any term of type t;

a formula A is said to be true in a model if in this model [A]=1 for any assignment to the variables;

a set G of formulas is said to be satisfied in a model if every formula from G is true in that model;

a set G of formulas is said to be satisfiable if there is at least one model in which G is satisfied;

a formula A is said to be a semantic consequence of a set G of formulas (which fact is denoted as G|=A) if A is true whenever G is satisfied.

Informally, the above construction can be interpreted as follows: $e_i$-terms (that is, terms of type $e_i$) represent entities of the i-th sort (either constant or depending on some variable objects) and t-terms represent truth values (also either constant or depending on some variable objects); ab-terms generally represent functions from a-objects to b-objects, for example, at-terms represent predicates about a-objects.

It is easy to check that the formulas:

$T \equiv (\lambda x_t x_t = \lambda x_t x_t)$ $F \equiv (\lambda x_t x_t = \lambda x_t T)$ (where the sign "≡" serves to introduce synonymous notations) in any model are represented by 1 and 0, correspondingly; that is why they define regular "true" and "false" sentences of the first-order logic. Similarly the regular sentential connectives and quantifiers can be defined:

$\sim \equiv \lambda x_t(F=x_t)$ (negation)

$\wedge \equiv \lambda x_t \lambda y_t(\lambda f_{(tt)}(fx=y)=\lambda f_{(tt)}(fT))$ (conjunction)

$\rightarrow \equiv \lambda x_t \lambda y_t((x \wedge y)=x)$ (implication)

$\vee \equiv \lambda x_t \lambda y_t(\sim x \rightarrow y)$ (disjunction)

$\forall x_a Y \equiv (\lambda x_a Y = \lambda x_a T)$ (generality quantifier)

$\exists x_a Y \equiv \sim \forall x_a \sim Y$ (existence quantifier)

A.3) $Ty_n$ Logic:

The power of $Ty_n$ (as well as of any other formal theory) is revealed by the fact that it is sufficient to supply a very short list of some special formulas (referred to as axioms) and inference rules in order to be able to obtain potentially infinite set of formulas which will be true in any model.

Following is the list of axioms of $Ty_n$:

$f_{tt}T \wedge f_{tt}F = Ax_t(f_{tt}x_t)$      1.

$x_a = y_a \rightarrow f_{ab}x_a = f_{ab}y_a$      2.

$Ax_a(f_{ab}x_a = g_{ab}x_a) = (f_{ab} = g_{ab})$      3.

$(\lambda x_a A_b(x_a))B_a = A_b(B_a)$      4.

where $A_b(B_a)$ comes from $A_b(x_a)$ by replacing all free occurrences of $x_a$ by the term $B_a$, and $B_a$ is free for $x_a$ in $A(x_a)$.

$Ty_n$ has a single inference rule:

1. from $A_a = A'_a$ and the formula B to infer the formula B' which comes from B by replacing one occurrence of $A_a$ (not immediately preceded by $\lambda$) by the term $A'_a$.

A proof in $Ty_n$ is a sequence of formulas each of which is either an axiom or else is obtained from earlier formulas by the inference rule. A formula A is said to be provable or a theorem of $Ty_n$, which fact is denoted as |–A, if there is a proof in which A is the last formula.

A formula A is said to be derivable from a set G of formulas if it is provable in $Ty_n$ supplied with all formulas from G as additional axioms, which fact is denoted as G |–A. A set G of formulas is said to be consistent if F is not derivable from G. Finally, if |–~A, then A is said to be refutable; we also say that A is refutable by G if G |–~A. It is easy to prove that, if A is refutable by G, then G $\vee\{A\}$ is inconsistent.

Now we are ready to formulate the two fundamental facts:

G|–A implies G|=A in all models (Soundness Theorem)

G|=A in all models implies G|–A (Completeness Theorem)

A final note: it is not to be supposed that any particular formula is either provable or refutable in $Ty_n$: in fact there is an infinite number of formulas that are neither provable nor refutable. This important fact allows extensions to the set of the common $Ty_n$ axioms by infinitely large consistent sets of additional, specific axioms. A theory obtained as the result of such an expansion of the axiom set is said to be a restriction of $Ty_n$ because the sets of provable and refutable formulas for the new theory, of course, contain more formulas.

Various attempts have been made to provide systems that process information in a variety of natural languages. U.S. Pat. No. 6,182,062 presents a system that coexistently stores information in a variety of languages. In this approach, the amount of storage needed increases in proportion to the number of languages. There is thus a widely recognized need for, and it would be highly advantageous to have, an information processing system able to communicate in a variety of natural and artificial languages, adopt new languages, store information in a single internal representation, and respond to requests for information in a language chosen by the client.

SUMMARY OF THE INVENTION

According to the present invention there is provided a method for information processing including the steps of: (a) providing an interpreter, the interpreter including: (i) a driver, and (ii) a language processor; (b) providing a knowledge base operative to store an internal representation of information; (c) providing a knowledge base manager; (d) providing an input/output module; (e) the interpreter converting, using the language processor, input information presented to the input/output module, and expressed in an external representation, into the internal representation; (f) the driver transmitting the internal representation of the input information to the knowledge base manager, and (g) the knowledge base manager modifying the knowledge base according to the knowledge base and according to the input information.

Preferably, in the method, the information stored in the internal representation in the knowledge base includes a definition of a derived language.

Preferably, in the method, the information stored in the internal representation in the knowledge base includes target information.

Preferably, in the method, the method further includes the step of: (h) converting the input information into the internal representation according to the definition of the derived language.

Preferably, in the method, the method further includes the step of: (h) using the definition of the derived language to convert information expressed in the internal representation into the derived language.

Preferably, in the method, the method further includes the step of: (h) using the definition of the derived language to convert a definition of an additional derived language, presented to the input/output module in the derived language, into a definition, in the internal representation, of the additional derived language.

Preferably, in the method, the internal representation includes entities logically equivalent to terms of a sorted-type theory.

Preferably, in the method, a set of primitive types of the sorted-type theory includes a symbolic type, and a constant of the symbolic type represents an elementary symbol of a language, and a function involving the symbolic type is operative to represent an aggregation of the elementary symbols.

Preferably, in the method, the set of primitive types of the sorted-type theory includes a meta-context type, and a constant of the meta-context type represents a meta-context including a set of non-logical axioms of the sorted-type theory, the meta-context further including a setting operative to control a behavior of a system, and a constant of functional type involving the meta-context type represents an operation on the meta-context.

Preferably, in the method, the method further includes the step of: (h) organizing the information in the internal representation stored in the knowledge base as a set of the meta-contexts.

Preferably, in the method, the method further includes the step of: (h) converting the input information into a sequence of operations on the meta-contexts.

Preferably, in the method, the operation includes an operation selected from the group consisting of adding an axiom to a meta-context, removing an axiom from a meta-context, modifying an axiom in a meta-context, retrieving an axiom from a meta-context, outputting information in an external representation via the I/O module, and changing the settings in a meta-context.

Preferably, in the method, the knowledge base includes a definition of a derived language, and the method further includes the step of: (h) if the input information includes, in a context defined in the definition of the derived language, a phrase undefined in the definition of the derived language, translating the phrase, according to the context, to at least one non-primitive term of the sorted-type theory, the term containing the phrase as at least one sub-term of a symbolic type.

Preferably, in the method, the method further includes the steps of: (i) if, in a new context, a phrase previously stored in the knowledge base as at least one non-primitive term is found, generating a new axiom of the sorted-type theory, and j) causing the knowledge base manager to replace the at least one non-primitive term with other terms.

Preferably, in the method, the knowledge base includes a definition of a derived language, and the method further includes the steps of: (h) if the input information includes, in a context defined in the definition of the derived language, a phrase undefined in the definition of the derived language, generating a new axiom of the sorted-type theory, and (i) adding the new axiom to the knowledge base.

Preferably, in the method, the knowledge base includes a definition of a derived language, and the method further includes the steps of: (h) if the input information includes, lo in a context defined in the definition of the derived language, a phrase undefined in the definition of the derived language, requesting clarifying input from a source selected from the group consisting of a client and a server, and (i) modifying the knowledge base according to the knowledge base and the clarifying input.

Preferably, in the method, the method further includes the steps of: (h) if the input information includes a query, the knowledge base manager processing the query according to the knowledge base and according to the query, and (i) transmitting to the driver, in the internal representation, a response to the query.

Preferably, in the method, the method further includes the step of: (h) if the conversion of the input information into the internal representation causes an error condition, storing a portion of the input information in the knowledge base as at least one term of a symbolic type.

Preferably, in the method, the method further includes the steps of: (h) detecting a contradiction between the input information and the knowledge base, and (i) modifying the knowledge base according to a set of error-handling rules stored in the knowledge base.

According to the present invention there is provided an information processing system including: (a) an interpreter, the interpreter including: (i) a driver, and (ii) a language processor; (b) a knowledge base operative to store an internal representation of information; (c) a knowledge base manager, and (d) an input/output module, the system operative to convert, using the language processor, input information presented to the input/output module, and expressed in an external representation, into the internal representation, the driver operative to transmit the internal representation of the input information to the knowledge base manager, the knowledge base manager being operative to modify the knowledge base according to the knowledge base and according to the input information.

According to the present invention there is provided a machine readable storage medium having stored thereon machine executable instructions, the execution of the machine executable instructions implementing a method for information processing, the method including the steps of: (a) providing an interpreter, the interpreter including: (i) a driver, and (ii) a language processor; (b) providing a knowledge base operative to store an internal representation of information; (c) providing a knowledge base manager; (d) providing an input/output module; (e) the interpreter converting, using the language processor, input information presented to the input/output module, and expressed in an external representation, into the internal representation; (f) the driver transmitting the internal representation of the input information to the knowledge base manager, and (g) the knowledge base manager modifying the knowledge base according to the knowledge base and according to the input information.

The system of the present invention exchanges with users and/or with other external agents (systems, programs, devices etc.) various kinds of information:
- primary documents and messages;
- meta information about these documents and messages;
- queries for various information processing, manipulation, and maintenance operations, such as searching, merging, comparison, classification, refinement, translation, etc.;
- definitions of verbal, graphic, or other languages in which all the above kinds of information, including language definitions, may be presented in input and/or output to/from the system.

The method of this invention is based on internal conversion of all the above kinds of information to sets of terms of a sorted-type theory [Gallin, Carpenter] with a set of primitive types including one or more special symbolic types, whose constants represent elementary symbols (such as letters or graphemes) of the system interface languages.

For example, constant $C^0_s$, where s denotes a symbolic type, may stand for the letter 'A', $C^1_s$—for 'B' and so on. In examples below these constants are denoted by the corresponding letters in quotes.

Constants of functional types involving only the symbolic type(s) represent various operations, such as concatenation, attachment, insertion, etc., to build strings, images or any other aggregations of the elementary symbols. For example, if the constant $C_{sss}$ stands for the operation of concatenation from left to right, then the term $C_{sss}$ 'm' ($C_{sss}$ 'a' 'n') represents the string "man" (in our notation of functional types, primitives are assumed to be associated in pairs from right to left, so that the type sss actually stands for (s(ss)) in the traditional notation of Gallin). In further examples such concatenated strings are simply denoted by double quoted strings like "man".

Constants of functional types combining symbolic and non-symbolic primitive types represent relationships of arbitrary order between the symbolic terms and terms of other types. For example, constant $Noun_{s(et)t}$ may stand for the relationship between English nouns and their denominators, whose elements are to be introduced by axioms such as:

$$Noun_{s(et)t} \text{"man"} C^1_{et}$$

where e and t denote individual and truth primitive types correspondingly. Similarly an axiom involving higher-order relationships may introduce, for example, the top-level structure of an English affirmative statement:

$$Affirm_{stt}=R_{(se(et)t)(e(et)t)stt}(J_{(set)(s(et)t)se(et)t} NP_{set} VP_{s(et)t})\lambda x_e \lambda x_{et}(x_{et}x_e)$$

where constants $R_{(sabt)\ (abc)sct}$ and $J_{(sat)(sbt)sabt}$ for any types a, b, c are defined to satisfy axioms:

$$J_{(sat)(sbt)sabt} p_{sat}\ q_{xbt}(C_{sss}x_s y_s)x_a y_b = (p_{sat}x_s x_a)\hat{}(q_{sbt}y_s y_b),$$

$$(R_{(sabt)\ (abc)sct} p_{sabt}\ r_{abc})x_s(r_{abc}x_a x_b) = p_{sabt}\ x_s x_a x_b$$

and constants $NP_{set}$ and $VP_{s(et)t}$ are assumed to define noun and verb phrases of the statement, correspondingly. Hierarchical sets of such axioms may form definitions of various artificial and natural languages, referred to herein as derived languages. Some derived languages may be defined and used especially in order to specify definitions of other derived languages. In order to initiate this process, that is to specify the very first derived language, the method of this invention also assumes employment of a built-in, i.e. a pre-defined language which must be capable of expressing an arbitrary term of the sorted-type theory. For example, the standard type theory notation [Gallin], or its adaptation used in the present description, might serve as such a built-in language.

The set of primitive types of the sorted-type theory may also include one or more special meta types allowing expression of some operations on sets of terms and/or other data and/or physical resources of the system. For example, a meta type m may stand for a pair of a set of axioms and an associated set of external devices, which pair is briefly referred to below as context. Terms of type mm then express various instructions that may be exchanged with the system as requests and responses—both can be directed from users and/or external agents to the system as well as in the opposite direction. For example, constants $Assert_{mm}$ and $Refute_{mm}$ may form instructions to add and delete an axiom to/from a given context. Another constant—$Test_{mm}$ might form an instruction to test an axiom against a context, i.e. to attempt to infer (prove) or refute it or some instance of it from the axiom set of this context and output to a certain external device a response depending on results of this attempt. Other instructions may control the overall system behavior, for example, $ReadIn_{(s(mm)t)mm}$ might instruct the system to switch to use of another input language. Instructions may also be independent of the axiom set of a given context, for example, $Send_{smm}$ might instruct the system to output a given term in some external representation to a certain external device, and constant $Eject_{mm}$ to simply execute a certain physical action.

Combining meta and symbolic types enables implementation of context-dependent languages. Statements of such a language, as well as some of their members, should be translated to some combined instructions, while some other constituents, such as pronouns, should be converted to functions from m to other types.

By means of the logical constant $P_{aata}$ defined to satisfy the axioms $$P_{aata}x_a y_a F = x_a, P_{aata}x_a y_a T = y_a,$$

where F and T stand for the false and true constants, respectively, and the operation of the superposition function, $$Super_{(ab)(bc)ac} = \lambda y_{ab} \lambda x_{bc} \lambda x_a(x_{bc}(y_{ab}x_a)),$$

arbitrarily complex instructions, i.e., programs, may be formed from a set of elementary (primitive) instructions.

A major innovative feature of the present invention is the employment of an internal representation of information based on a specialized version of sorted-type theory with a set of primitive types including at least one symbolic type whose constants represent elementary symbols, such as letters or graphemes, of the system interface languages (for example, all Unicode codes). This crucial innovation implies the following unique and useful features that might not be achieved otherwise:

Keeping both target information (i.e., the information that the knowledge base stores and uses to answer client queries) and definitions of interface languages (which may, logically, be thought of as a form of target information) in a single internal representation and in a single knowledge base, in contradistinction to existing systems that maintain target information and language definitions separately;

Ability to define and implement languages of a wider class than when employing other methods of language definition representation (it is proven that the proposed representation actually covers all so-called recursively computable languages, a class that includes most, if not all, languages that might be practically implemented);

Ability to support, along with verbal languages, various graphical languages (for example, languages of tables, diagrams or schemes);

In combination with employment of the meta context type the proposed internal information representation also enables definitions and implementation of context-dependent languages (including most, if not all, natural languages, and many useful artificial languages);

Ability to robustly process and store partially parsed external (textual) representation of information (i.e., even when a currently used language definition does not cover all words, phrases or grammar forms encountered in a text, the information can be stored, and then parsed after a more complete definition for the language is available to the system);

Ability to extend a language definition in the knowledge base by requesting clarifying information from external sources of information;

Ability to automatically extend a language definition in the knowledge base when new words or phrases are encountered in a known textual context;

Ability to automatically extend a language definition in the knowledge base when repeatedly encountering in a new textual context words or phrases which were previously stored in the knowledge base in a partially parsed form.

Organizing the knowledge base in the form of multiple meta contexts, each containing its own set of (non-logical) axioms of the above-mentioned specialized version of sorted-type theory, enables flexible and effective processing of inconsistent, contradictory or incomplete information (usually coming from disparate sources).

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system for processing information which can be used by clients to store, process, and retrieve information without having to know a particular database language or natural language. Specifically, the present invention can be used to gather information in a variety of natural and artificial languages, store the information in an internal representation, and, in response to queries about that information, presented in any of a variety of languages, provide answers in a language chosen by the client.

The principles and operation of an information processing system according to the present invention may be better understood with reference to the drawings and the accompanying description.

Figure 1:
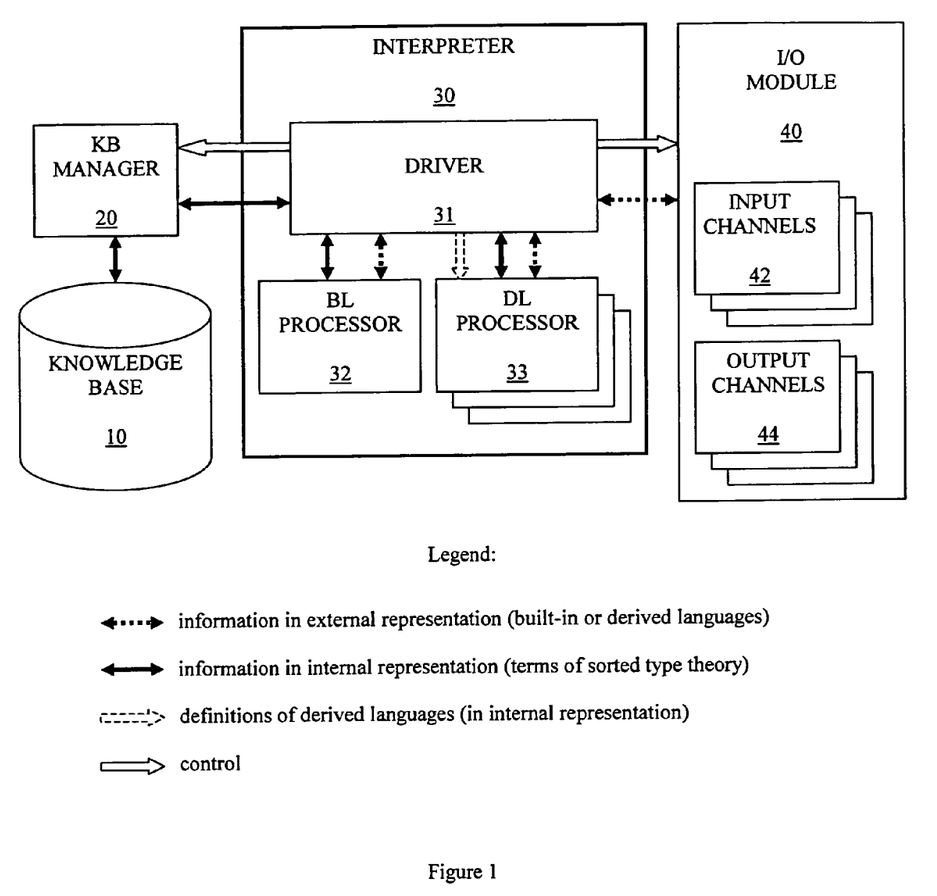
FIG. 1 is a schematic illustration of an information processing system according to the present invention.

Referring now to the drawings, FIG. 1 illustrates schematically a preferred embodiment of an information processing system according to the present invention.

Major components of the system include:
a Knowledge Base (KB) 10;
a Knowledge Base Manager (KB Manager) 20;
an Interpreter 30, in turn including:
  a Driver 31;
  a Built-in Language Processor (BL Processor) 32; and
  dynamically instantiated Derived-Language Processors (DL Processors) 33, and
an Input/Output Module (I/O Module) 40.

The modules of the system perform the following functions.

Knowledge Base 10 stores sets of axioms of the sorted-type theory (each set corresponding to a particular context).

Knowledge Base Manager 20, controlled by Interpreter 30, creates, deletes and searches axioms and contexts in Knowledge Base 10; the search function of KB Manager 20 generally assumes an inference of an axiom being tested or its negation or an instance from the current contents of KB 10.

Driver 31 (within Interpreter 30):
  directs information, expressed in various languages, from input channels 42 of I/O Module 40 to corresponding language processors 32, 33 for translation (parsing) into instructions in the internal representation.
  performs the instructions by controlling KB Manger 20 and I/O Module 40 and passing to KB Manger 20 and I/O Module 40 information in internal and external representations, respectively, and instantiating, when required, new derived-language processors 33.
  directs system responses expressed in various languages to corresponding output channels 44 of I/O Module 40.
  handles any errors encountered in parsing and performing instructions, expressing responses, or accessing Knowledge Base 10 or external devices and resources according to built-in and/or client-defined rules.

Built-in Language Processor 32 parses input information expressed in a built-in language to instructions in internal representation and expresses system responses in the same built-in language.

Each Derived-Language Processor 33 parses input information expressed in a corresponding language to instructions in internal representation and expresses system responses in the same language, and raises an error when a response is not expressible in this language. A Derived-Language Processor 33 may be implemented using a derived-language definition stored in Knowledge Base 10 as terms of the sorted-type theory, i.e., the internal representation. Thus, the same software that processes the internal representation can be used to process the derived languages, eliminating the need to create software dedicated to that purpose. Furthermore, definitions of derived languages may be presented to the system in a choice of languages including the internal representation, a built-in language, and any previously-defined derived language Interpreter 30 as a whole:
- translates all input information received from I/O Module 40 in external representations, i.e. expressed in built-in or derived languages, to instructions in internal representation, i.e. terms of the sorted-type theory).
- performs the instructions and handles any errors.
- sends to I/O Module 40 system responses in an external representation.

I/O Module 40, controlled by Interpreter 30, establishes and maintains logical channels 42, 44 for exchanging input and output information between Interpreter 30 and local or remote clients, including external devices, informational resources and agents.

The system as a whole functions in the following way. Upon starting up, at least one input channel 42 is assigned to input information expressed in a particular built-in or previously-defined derived language and at least one output channel 44 is assigned to output system responses expressed in a built-in or previously-defined derived language. The language of an output channel 44 assigned to a particular dialog may or may not be the same as the language of an input channel 42 assigned that same dialog. The system starts to read input information, translate it to internal instructions, and execute these internal instructions.

Execution of an instruction generally results in one or more of the following:
- changing the contents and/or state of the system Knowledge Base 10;
- outputting some terms in corresponding external representation to currently active output channels 44;
- changing rules for handling errors;
- changing the configuration of active input/output channels 42, 44, and or changing which languages are assigned to individual input/output channels 42, 44;
- raising and handling an error;
- termination of the current session.

In particular, a sequence of instructions may create in the system Knowledge Base 10 a definition of a new language which then may be assigned to an input channel 42 or an output channel 44. Lexemes and syntactic constructs of a derived language may serve as shortcuts for arbitrarily complex programs, i.e. combinations of instructions.

Storing new primary content or meta information in the system is reduced to adding a new set of axioms to Knowledge Base 10. Contradictions and inconsistencies, as well as any other errors encountered during this process, are handled in accordance with currently set rules. Encountering in the input information from an input channel 42 fragments which cannot be parsed in the particular language assigned to that input channel 42 does not prevent complete storage of this information in the system because such fragments may be still stored in Knowledge Base 10 in the form of terms of a symbolic type. Moreover, if later the language definition in the system is extended, these fragments may be re-parsed and converted to new axioms in Knowledge Base 10.

Other information processing operations, such as searching, merging, comparison, classification, refinement, translation, etc., are performed by programs that might be associated with certain queries in specially-defined input languages or entered by a user or another agent as a sequence of instructions or/and queries.

Among external clients or agents with which the system exchanges information there might be other instances of the same system. This allows sharing and merging knowledge and information that might relate to different application areas, the information being accumulated independently and, possibly, initially expressed in different terminology or even different languages.

Figure 2:
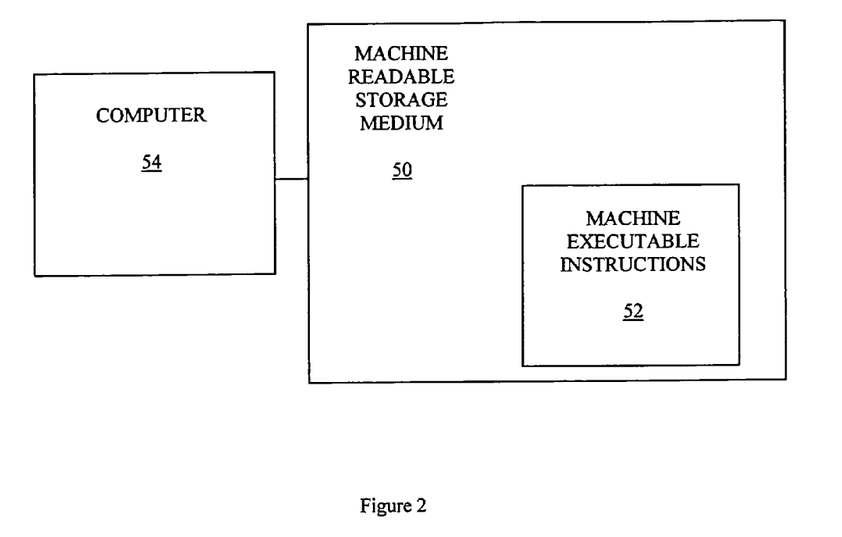
FIG. 2 is a schematic illustration of a storage medium containing instructions to implement the present invention.

An information processing system according to the present invention may be implemented as illustrated schematically, by way of example only, in FIG. 2. A computer 54 executes machine executable instructions 52 stored in machine readable storage medium 50. Machine readable instructions 52 are selected, in accordance with that which is taught in the present invention, such that execution of machine readable instructions 52 by computer 54 is operative to process information as described above.

Machine readable storage medium 50 can include, but is not limited to, a memory device, such as a ROM or RAM, an optical storage medium, such as a CD-ROM or DVD, or a magnetic storage medium, such as a disk or tape. Optionally, machine readable storage medium 50 can be accessed remotely via a communication link.

Many alterations and modifications of the information processing system illustrated in FIG. 2 may be made within the scope of the present invention. It is to be understood that the example of FIG. 2 is presented herein by way of illustration only, and is in no way intended to be considered limiting.

While the invention has been described with respect to a limited number of embodiments, it will be appreciated that many variations, modifications and other applications of the invention may be made.

What is claimed is:

1. A method for information processing comprising the steps of:
   (a) providing an interpreter of an n-sorted type theory based query, said interpreter including:
      (i) a driver for transmitting an axiom of an n-sorted type theory, and
      (ii) an n-sorted type theory based language processor;
   (b) providing an n-sorted type theory based knowledge base operative to store information selected from the group consisting of textual information, tabular information and graphic information in an internal representation including at least one axiom of said n-sorted type theory;
   (c) providing an n-sorted type theory based knowledge base manager;
   (d) providing an input/output module operative to convert information from an external representation selected from the group consisting of textual information, tabular information and graphic information into said internal representation including at least one axiom of said n-sorted type theory;
   (e) said interpreter converting, using said language processor, input information presented to said input/output module, and expressed in an external representation, into said internal representation;
   (f) said driver transmitting said internal representation of said input information to said knowledge base manager, and
   (g) said knowledge base manager modifying said knowledge base according to said knowledge base and according to said input information.

2. The method of claim 1, wherein the information stored in said internal representation in said knowledge base includes a definition of a derived n-sorted type theory based language.

3. The method of claim 2, wherein the information stored in said internal representation in said knowledge base includes target information.

4. The method of claim 2, wherein the method further comprises the step of:
  (h) converting said input information into said internal representation according to said definition of said derived language.

5. The method of claim 2, wherein the method further comprises the step of:
  (h) using said definition of said derived language to convert information expressed in said internal representation into said derived language.

6. The method of claim 2, wherein the method further comprises the step of:
  (h) using said definition of said derived language to convert a definition of an additional derived language, presented to said input/output module in said derived language, into a definition, in said internal representation, of said additional derived language.

7. The method of claim 1, wherein said internal representation includes entities logically equivalent to terms of said n-sorted type theory.

8. The method of claim 7, wherein a set of primitive types of said n-sorted type theory includes a symbolic type, and wherein a constant of said symbolic type represents an elementary symbol of a language, and wherein a function involving said symbolic type is operative to represent an aggregation of said elementary symbols.

9. The method of claim 7, wherein said set of primitive types of said n-sorted type theory includes a meta-context type, and wherein a constant of said meta-context type represents a meta-context including a set of non-logical axioms of said n-sorted type theory, said meta-context further including a setting operative to control a behavior of a system, and wherein a constant of functional type involving said meta-context type represents an operation on said meta-context.

10. The method of claim 9, wherein the method further comprises the step of:
  (h) organizing the information in said internal representation stored in said knowledge base as a set of said meta-contexts.

11. The method of claim 9, wherein the method further comprises the step of:
  (h) converting said input information into a sequence of said operations on said meta-contexts.

12. The method of claim 11, wherein said operation includes an operation selected from the group consisting of adding an axiom to a said meta-context, removing an axiom from a said meta-context, modifying an axiom in a said meta-context, retrieving an axiom from a said meta-context, outputting information in an external represntation via said input/output module, and changing said settings in a said meta-context.

13. The method of claim 7, wherein said knowledge base includes a definition of a derived n-sorted type theory based language, and wherein the method further comprises the step of:
  (h) if said input information includes, in a context defined in said definition of said derived language, a phrase undefined in said definition of said derived language, translating said phrase, according to said context, to at least one non-primitive term of said n-sorted type theory, said theory, containing said phrase as at least one sub-term of a symbolic type.

14. The method of claim 13, wherein the method further comprises the steps of:
  (i) if, in a new context, a phrase previously stored in said knowledge base as at least one non-primitive term is found, generating a new axiom of said n-sorted type theory, and
  (j) causing said knowledge base manager to replace said at least one non-primitive term with at least one other term.

15. The method of claim 7, wherein said knowledge base includes a definition of a derived language, and wherein the method further comprises the steps of:
  (h) if said input information includes, in a context defined in said definition of said derived language, a phrase undefined in said definition of said derived language, generating a new axiom of said n-sorted type theory, and
  (i) adding said new axiom to said knowledge base.

16. The method of claim 7, wherein said knowledge base includes a definition of a derived language, and wherein the method further comprises the steps of:
  (h) if said input information includes, in a context defined in said definition of said derived language, a phrase undefined in said definition of said derived language, requesting clarifying input from a source selected from the group consisting of a client and a server, and
  (i) modifying said knowledge base according to said knowledge base and said clarifying input.

17. The method of claim 1, wherein the method further comprises the steps of:
  (h) if said input information includes a said n-sorted type theory based query, said knowledge base manager processing said query according to said knowledge base and according to said query, and
  (i) transmitting to said driver, in said internal representation, a response to said query.

18. The method of claim 1, wherein the method further comprises the step of:
  (h) if said conversion of said input information into said internal representation causes an error condition, storing a portion of said input information in said knowledge base as at least one term of a symbolic type.

19. The method of claim 1, wherein the method further comprises the steps of:
  (h) detecting a contradiction between said input information and said knowledge base, and
  (i) modifying said knowledge base according to a set of error-handling rules stored in said knowledge base.

20. An information processing system comprising:
  (a) an interpreter of an n-sorted type theory based query, said interpreter including:
    (i) a driver for transmitting an axiom of an n-sorted type theory, and
    (ii) an n-sorted type theory based language processor;
  (b) an n-sorted type theory based knowledge base operative to store information selected from the group consisting of textual information, tabular information and graphic information in an internal representation including at least one axiom of said n-sorted type theory;
  (c) an n-sorted type theory based knowledge base manager, and
  (d) an input/output module operative to convert information from an external representation selected from the group consisting of textual information, tabular information and graphic information into said internal representation including at least one axiom of said n-sorted type theory, the system operative to convert, using said language processor, input information presented to said input/output module, and expressed in an external representation, into said internal representation, said driver operative to transmit said internal representation of said input information to said knowledge base manager, said knowledge base manager being operative to modify said knowledge base according to said knowledge base and according to said input information.

21. A machine readable storage medium having stored thereon machine executable instructions, the execution of said machine executable instructions implementing a method for information processing, the method comprising the steps of:
  (a) providing an interpreter of an n-sorted type theory based query, said interpreter including:
    (i) a driver for transmitting an axiom of an n-sorted type theory, and
    (ii) an n-sorted type theory based language processor;
  (b) providing an n-sorted type theory based knowledge base operative to store information selected from the group consisting of textual information, tabular information and graphic information in an internal representation including at least one axiom of said n-sorted type theory;
  (c) providing an n-sorted type theory based knowledge base manager;
  (d) providing an input/output module operative to convert information from an external representation selected from the group consisting of textual information, tabular information and graphic information into said internal representation including at least one axiom of said n-sorted type theory;
  (e) said interpreter converting, using said language processor, input information presented to said input/output module, and expressed in an external representation, into said internal representation;
  (f) said driver transmitting said internal representation of said input information to said knowledge base manager, and
  (g) said knowledge base manager modifying said knowledge base according to said knowledge base and according to said input information.

* * * * *